July 30, 1929.  L. H. KAUPKE  1,722,580
LISTER
Filed June 10, 1925
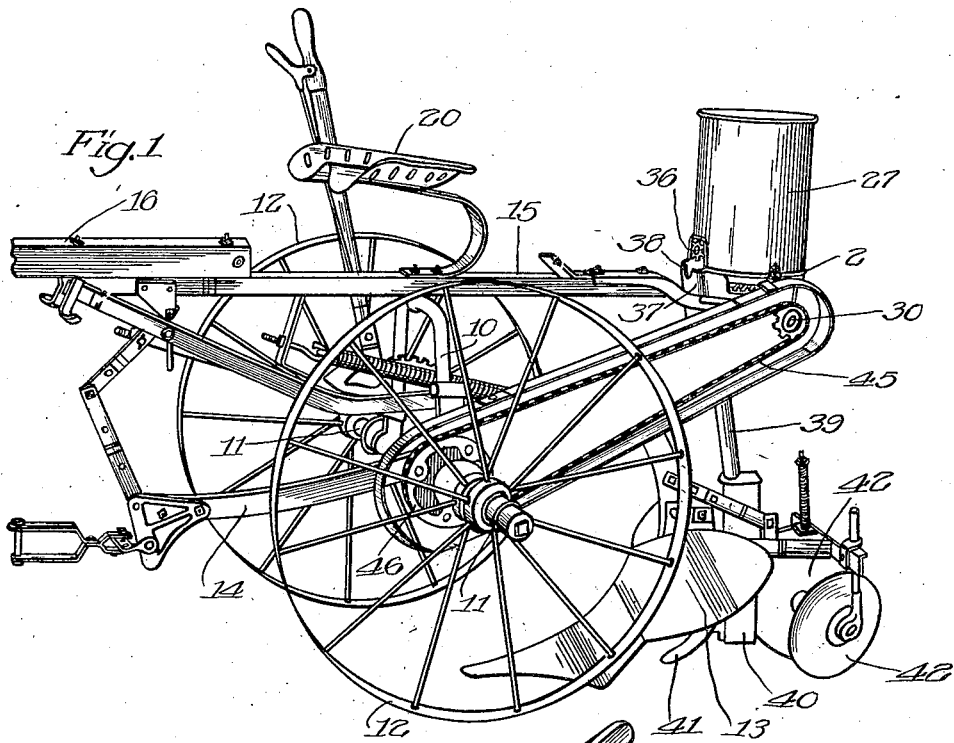
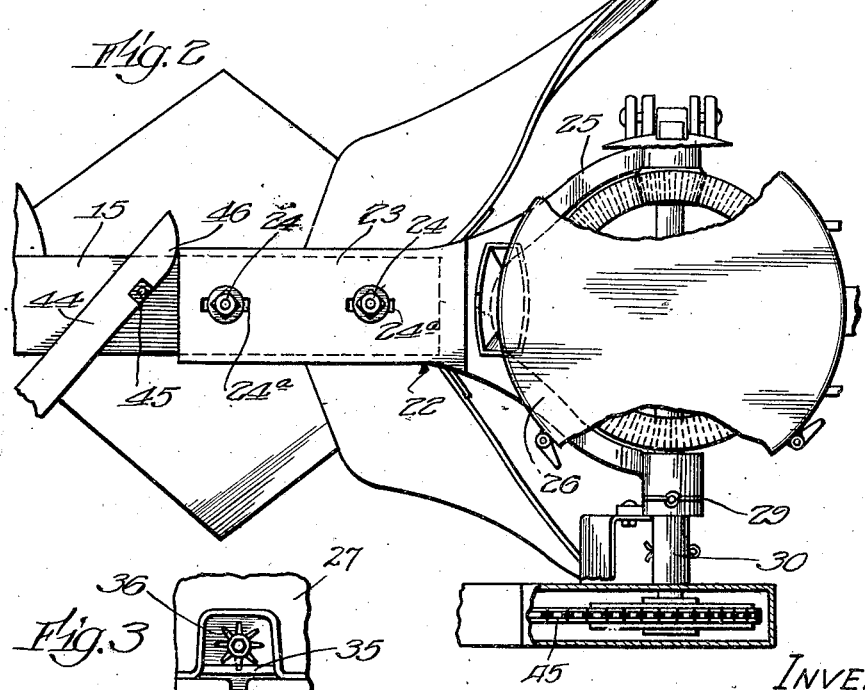
INVENTOR:
Lee H. Kaupke
BY Offield Mehlhope Pratt & Poole
ATTYS.

Patented July 30, 1929.

1,722,580

UNITED STATES PATENT OFFICE.

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

LISTER.

Application filed June 10, 1925. Serial No. 36,094.

This invention relates to improvements in planters or listers especially adapted for planting cotton or corn, and more particularly to riding planters wherein the automatic seed dropping mechanism is carried rearwardly of the rider's seat.

As heretofore constructed, planters or listers of the class above described are provided with automatic planting mechanism, comprising a seed can and feeding mechanism mounted on the rear end of a longitudinally extending frame member or support overhanging the rear end of the planter frame, this arrangement of the planting mechanism in trailing relation with respect to the supporting wheels being widely used in planting machines of this type. As heretofore constructed, the seed can and the feed operating mechanism have been supported directly upon the rear end of a projecting supporting frame, with the discharge spout arranged at the rear end of the seed can so as not to interfere with the supporting frame and its bearing connections with the seed can operating mechanism.

The object of the present invention is to provide a re-arrangement of the seed can and its supporting member whereby the delivery or dropping device including the down spout is arranged in front of the can with the spout passing through the support which is especially formed to accommodate the same, and means are provided whereby the dropping of the seeds may be visible from the driver's seat arranged forwardly thereof, and thus the driver may ascertain at any time during the operation of the planter whether or not the seeds are being planted in the proper manner, or whether or not the seed supply has been exhausted, without making it necessary to dismount for this purpose. I also provide in connection with the seed can support, an improved means for adjusting the tension of the drive chain.

The invention may best be understood by reference to the accompanying drawings, in which Figure 1 is a perspective view of a planter constructed in accordance with my invention.
Figure 2 is an enlarged fragmentary plan view of the rear end of the frame, and the seed can supporting member and planting mechanism, with parts omitted.

Figure 3 is a detail view taken from the front, and showing the means for affording view of the seeds as they drop in the delivery spout.

Referring to the details of the drawings, my invention is shown as applied to a planter or lister having an arched axle 10 with axles 11—11 and supporting wheels 12—12. A sweep or bottom 13 is carried on a beam 14 extending beneath the central part of the arched axle 10. A longitudinal frame member 15 is connected to the upper end of the arched axle 10 and has a tongue 16 connected at the forward end thereof. A driver's seat 20 is mounted centrally of the longitudinal frame member or bar 15, as herein shown being substantially over the supporting wheels 12—12. The planting mechanism is mounted at the rear end of the frame member 15 as herein shown being connected to the frame member 15 by a supporting member 22. This supporting member is preferably of metal, having a forward channel-shaped end 23 fitting over the longitudinal frame member 15 and connected thereto by means of bolts 24—24 permitting limited longitudinal movement of said supporting member with respect to said frame member by means of longitudinal slots 24ª—24ª. The portion of the supporting member 23 extending rearwardly of the frame member 15 is bifurcated, forming arms 25 and 26 extending beneath the seed can 27 and providing support for the seed can and bearings 28 and 29 for a longitudinal shaft 30 forming part of the seed dropping mechanism. This seed dropping mechanism may be of any approved construction, as for instance, a bevel pinion 31 on shaft 30 drives a gear 32 connected with a revolving seed plate 35 of the usual form. In my improved device, the periphery of the seed plate is visible through an opening 34 at the lower margin of the seed can at the front thereof, as best shown in Figure 3, this plate having the usual series of seed pockets with cooperating ejecting mechanism, herein comprising a rotatable ejector member 36 having a plurality of fingers adapted to engage in the seed pockets to eject the seeds from the seed plate 35 in the usual manner. A spout 37 is arranged immediately below the ejecting mechanism just described, and is provided with a suitable opening, herein shown as a notch or slot 38 through which the driver, mounted on seat 20, may readily observe whether or not the seeds are being properly deposited by the action of the planting mechanism. The spout 37 extends downwardly through or between the bifurcated arms 25 and 26 of the supporting member 22, and communicates through a tube 39 to a delivery chute 40 arranged behind the runner opener 41 in the usual manner for delivering the seeds for planting. Discs 41—41 or their equivalent may be provided for covering the seeds as soon as deposited.

The planting mechanism is suitably driven through an operative connection with the supporting wheels 12—12, as herein shown this operating connection consisting of a chain 45 passing over a drive sprocket 46 carried by one of the wheels 12 and a cooperating sprocket 47 mounted on the drive shaft 30. The chain may be tightened by shifting the entire supporting member 22 longitudinally of the bar 15, the supporting member being slotted at 24ª for this purpose and permitting adjustment in various positions by clamping the bolts 24—24. In order to assist in this adjustment for tightening the chain, I provide a lever 44, pivoted to the bar 15 at 45, and having its shorter end 46 adapted to engage the front end of supporting member 22, as clearly shown in Figure 2. I find it preferable to bend the forward end of lever 44 upwardly, as seen in Figure 1, so that the device may be readily manipulated.

While I have illustrated and described one particular embodiment of my invention, it will be understood that I do not wish to be limited to the exact construction shown and described, but that various changes and modifications may be made without departing from the spirit and scope of the invention.

I claim:

In a wheeled lister, a frame having a seat thereon, a bifurcated member projecting rearwardly from said frame forming two supporting arms at its rearward end, a seed dropping mechanism comprising a seed can, a seed plate, and rotating means for said plate including a drive shaft extending transversely below said plate, said supporting arms affording bearing for said shaft at opposite sides of said can, and delivery means at the front of said can including a spout extending downwardly between said supporting arms, said spout having an opening at the front thereof permitting observation of seed passing downwardly therethrough.

Signed at Rock Island, Ill., this fifth day of June, 1925.

LEE H. KAUPKE.